United States Patent [19]

Krevor et al.

[11] Patent Number: 4,860,851

[45] Date of Patent: Aug. 29, 1989

[54] DIMENSIONALLY-RECOVERABLE DAMPING ARTICLE

[75] Inventors: David H. Krevor, San Carlos; Paul Martens, Fremont, both of Calif.

[73] Assignee: Raychem Corporation, Menlo Park, Calif.

[21] Appl. No.: 7,050

[22] Filed: Jan. 27, 1987

[51] Int. Cl.$^4$ .............................................. F16F 15/00
[52] U.S. Cl. .................................. 181/207; 181/208; 181/294; 181/296
[58] Field of Search ............................. 181/207–209, 181/290, 296, 294

[56] References Cited

U.S. PATENT DOCUMENTS

| | | | |
|---|---|---|---|
| 2,027,962 | 1/1936 | Currie | 29/447 X |
| 3,086,242 | 4/1963 | Cook et al. | 264/566 |
| 3,087,571 | 4/1967 | Kerwin, Jr. | 181/208 |
| 3,597,372 | 8/1971 | Cook | 523/300 |
| 3,904,211 | 9/1975 | Deger | 277/32 |
| 4,121,686 | 10/1978 | Keller, Jr. | 181/233 |

FOREIGN PATENT DOCUMENTS 1155470  6/1969  United Kingdom .

*Primary Examiner*—B. R. Fuller
*Attorney, Agent, or Firm*—Edith A. Rice; Herbert G. Burkard

[57] ABSTRACT

Acoustic damping is provided by a dimensionally-recoverable article, either in single layer or constrained-layer form. The single layer, or the damping layer of a constrained-layer article, comprises a mixture of a damping component (generally having a high tangent delta value) and a hold-out component (generally having a significant crystallinity).

11 Claims, 3 Drawing Sheets

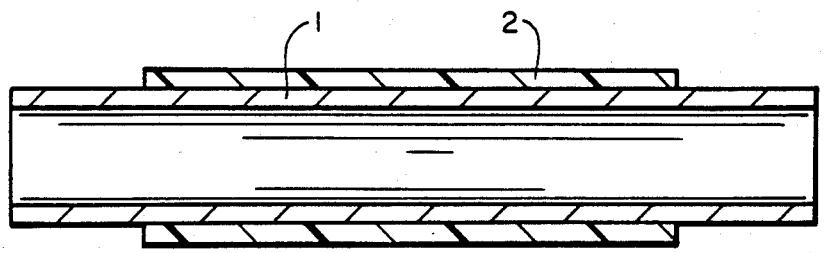
FIG_1
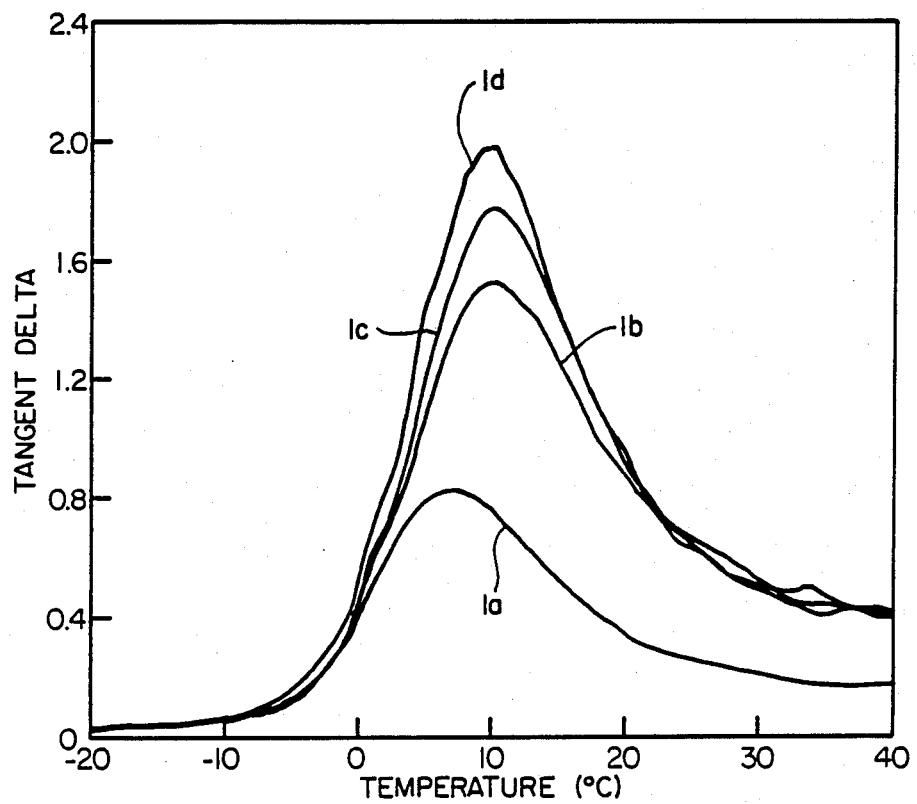
FIG_2

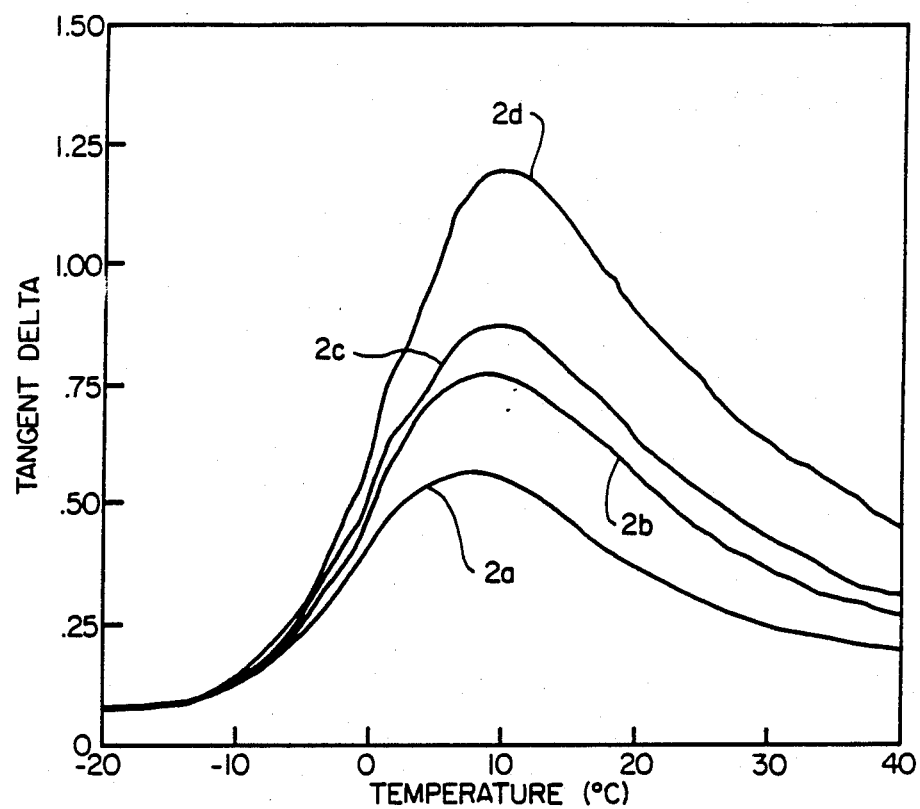
FIG_3
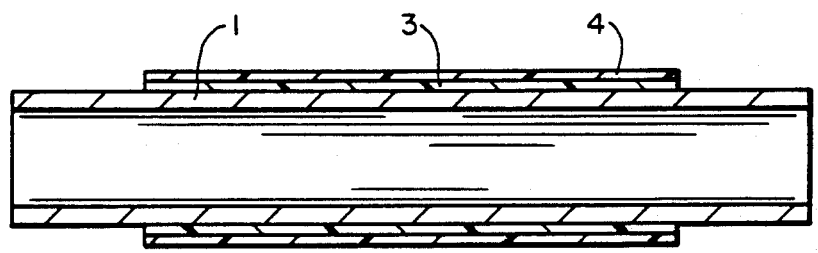
FIG_4

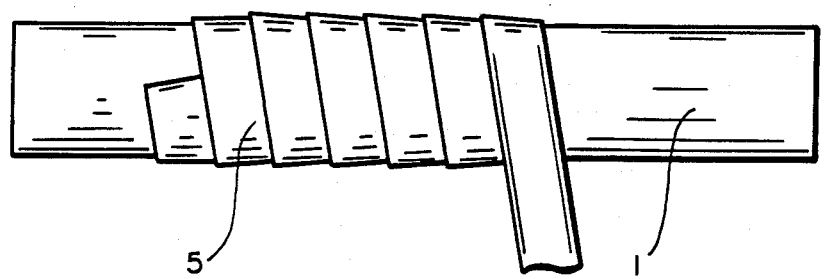
FIG_5
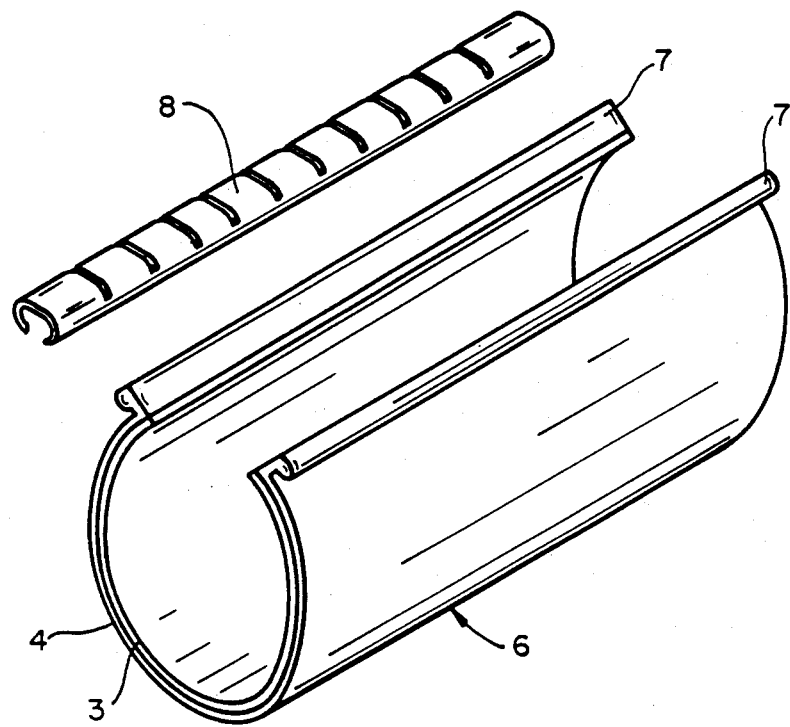
FIG_6

DIMENSIONALLY-RECOVERABLE DAMPING ARTICLE

The present invention relates to the provision of acoustic damping of substrates susceptible to vibration.

Many mechanical structures are subject to vibration, where vibration is desirably minimized in order to reduce unpleasant noise, reduce mechanical damage due for example to fatigue, or to reduce the likelihood of the vibrating structure being detected (known as a reduction in target strength) for example by sonars. A further use may be to reduce reflection of incident rays for example in the manufacture of anechoic covers.

A known technique of damping employs viscoelastic polymeric materials affixed to the vibrating structure, such that vibration causes deformation or strain of the viscoelastic material. Part of the energy that caused the deformation and imparted to the material is restored to the vibrating structure due to the elasticity of the material, and part is viscously dissipated as heat within the material. A material is a good damping material to the extent that such energy is dissipated rather than elastically restored; and damping ability may be quantified as tangent delta, the ratio between the energy dissipated and the energy restored, or equivalently between the loss modulus and the elastic modulus (see ASTM-D-2236). Tangent delta is a function of temperature and frequency of vibration.

Damping efficiency may be improved by forcing the damping layer to deform in a more dissipative way, namely by shear. This is done by constraining an otherwise free surface of the damping material, and the resulting phenomenon is referred to as constrained layer damping. A laminate is therefore formed between a damping layer and a constraining layer (for example two sheets are bonded together), which laminate is then affixed to the structure whose vibration is to be damped, with the damping layer adjacent the substrate. It is desirable that substantially all of the surface of the damping layer be bonded to the constraining layer or to the structure.

If damping by either a single layer or by constrained layers is to be successful, it is necessary as a first step that vibrational energy be transmitted from the vibrating structure to the polymeric damping material and if that is to happen the polymeric material must be acoustically coupled to the structure. A possibility of relative movement between the structure and damping material will preclude efficient transfer of energy.

This need for tight engagement has led to problems, primarily due to the need for powerful adhesives which are difficult to deal with and make future removal of the damping material difficult or impossible. One prior art system may be described to illustrate the problem.

Damping may be desirable in ships, aircraft and motor vehicles etc. to prevent pipes or structural members (for example hulls) vibrating in response to vibrations set up by engines or transmissions or pumps etc. Such vibration is referred to as structure borne noise. A prior art solution is to coat the pipe (or structure) to be damped with a powerful, viscous adhesive, by means of which a viscoelastic sheet of about 20 mils (0.05 cm) thickness is bonded to the pipe. A number of metal rods, generally square in cross-section and about as thick as the material of the pipe, are then placed lengthwise along the pipe over the sheet and spaced apart around the circumference of the pipe. This entire assembly is further secured by a clamp that surrounds the metal rods. Whilst this technique can provide satisfactory levels of damping, it has serious drawbacks. Firstly, it is labor intensive and difficult, particularly as regards the application of adhesive which must hold the sheet tightly against the pipe and ultimately support the weight of the rods. Secondly, the technique is not easily used other than on straight sections of pipe; bends, collars and valves being particularly difficult to deal with. Thirdly, the rods increase the weight of the pipe, often by 50%. A fourth disadvantage is that the damping sheet is almost impossible to remove due to the nature of the adhesive required. Clearly, the provision of high levels of damping is not easily achieved, in part due to the requirement for tight engagement of the damping material.

We have discovered that articles can be made having both significant damping, and significant dimensional recoverability, and that dimensional recoverability may be used to aid or provide acoustic coupling of the damping article and the structure to be damped. This is surprising in view of the apparently conflicting polymer properties required for recoverability and for damping. Similar considerations apply to the case where the vibrational energy originates outside of the structure: The article can also be used as an anechoic coating, and reference herein to the provision of acoustic damping includes the provision of an anechoic coating.

Thus, the invention provides a method of providing acoustic damping of a substrate, which comprises:

(i) providing an article, comprising a layer of a material that
(a) is dimensionally-recoverable, having a recovery of at least 10%; and
(b) exhibits viscoelastic damping, having a tangent delta value greater than 0.5 at a temperature between $-10°$ C. and $300°$ C., and at a frequency between 5 and 100,000 Hz.

(ii) positioning said article adjacent a surface of the substrate subject to acoustic vibration; and (iii) causing dimensional-recovery of said article to achieve acoustic coupling with said surface.

The invention also provides an article for acoustic damping of a substrate, comprising:

(i) a damping first layer comprising a material that
(a) is preferably dimensionally recoverable having a recovery of at least 10%, preferably 20%, and
(b) alone exhibits viscoelastic damping, having a tangent delta value of at least 0.2, preferably 0.5, more preferably 1.0 at a temperature between $-10°$ C. and $300°$ C. and at a frequency between 5 and 100,000 Hz; and (ii) a constraining layer that is laminated to a substantial portion of a major surface of said first layer and that comprises a material that is dimensionally recoverable having a recovery of at least 10%, preferably 20%;
the first and second layers together having a tangent delta value of at least 0.1 at a temperature between $-10°$ C. and $300°$ C. and at a frequency between 5 and 100,000 Hz; and being capable of exhibiting constrained layer damping when installed on the substrate.

The articles preferably exhibit damping to the extent desired over a range of frequencies of vibration, preferably 5 to 100,000 Hz, more preferably 5 to 25,000 Hz. The method is preferably carried out at a temperature and at an acoustic frequency such that the material is in what may be called its transition region. A transition region, for a polymeric material, is that region between its low temperature, high frequency region where it has a generally glassy structure, and its high temperature, low frequency region where it has generally a rubbery structure. Optimum damping performance occurs in the transition region.

By a dimensionally-recoverable article is meant an article whose dimensional configuration may be made to change when subjected to an appropriate treatment, for example heating. Usually such articles recover towards an original shape from which they have previously been deformed but the term "recoverable", as used herein, also includes an article which adopts a new configuration even if it has not been previously deformed.

In their most common form, such articles comprise a heat-shrinkable sleeve or moulded part (which may be in tubular or wrap-around form) made from a polymeric material exhibiting the property of elastic or plastic memory as described for example in U.S. Pat. Nos. 2,027,962, 3,086,242 and 3,597,372, the disclosures of which are incorporated herein by reference. As is made clear in, for example, U.S. Pat. No. 2,027,962, the original heat-stable form may be a transient form in a continuous process in which, for example, an extruded tube is expanded, whilst hot, to a dimensionally heat-unstable form but, in other applications, a preformed dimensionally heat-stable article is deformed to a dimensionally heat-unstable form in a separate stage.

In the production of heat-recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point of the polymer, deforming the article and cooling the article whilst in the deformed state so that the deformed state of the article is retained. In use, since the deformed state of the article is heat-unstable, application of heat will cause the article to assume its original heat-stable state.

In order for the polymeric material to retain its heat-unstable state it is clearly necessary that it have some thermoplastic component, generally exhibiting a crystalline melting point as mentioned above. Thus, above the crystalline melting point the material may behave as an elastomer allowing the deformation mentioned above, but when cooled to below the crystalline melting point, the resulting crystallization will lock the material in its deformed state. Dimensional-recoverability is also possible in materials that are amorphous at all relevant temperatures, but low temperature stiffness is still required, in this case below a softening point. At a higher temperature such amorphous materials will be dissipative and may contribute to damping.

This crystallinity or stiffness, essential for recoverability, unfortunately is contrary to what one apparently requires for acoustic damping. The two properties appear to be incompatible. It is of course true that any material could be regarded as having some damping capability (although not to such a degree that any material would be practically useful for damping) and recoverable materials have been proposed comprising various blends of an elastomer and a thermoplastic polymer. U.S. Pat. No. 3,597,372, (Cook) for example,
ion may comprise from 5–50% by discloses that a composite weight (based on the total) of a thermoplastic material, such as polyethylene, the remainder being an elastomer for example a natural rubber or butadiene styrene copolymer etc. The thermoplastic material provides the recoverability and the elastomer is present to modify its physical properties to reduce wear. It does this by allowing elastomeric deformations such that stress caused by its contact with sharp objects is spread over a wide area. The material should have a high resilience and there is no suggestion, therefore, that such a material would be useful for damping, nor is any suggestion made as to how damping performance could be improved.

Reference may be made to two documents that disclose heat-shrinkable articles where an effect is to diminish the effect of vibration. In the first of these documents the heat shrinkable article appears not to make use of a highly dissipative polymer, but rather prevents the transfer of vibrational energy. In this document, U.S. Pat. No. 3,904,211, a heat shrinkable boot holds a sealing ring in place on a shaft that rotates within a stationary housing. The second document, U.S. Pat. No. 4,121,686, suggests that sound waves in a tank be damped by a damping material held to its surface by a separate thin heat-shrinkable plastics film.

For the present invention, it is preferred that the recoverable, damping article comprises at least two polymeric components, one contributing primarily to damping and being typically elastomeric, and another contributing primarily to recoverability and being typically partially crystalline. These two components will be referred to herein respectively as the damping component and the hold-out component. Where constrained layer damping is to be invoked, the damping layer will have a higher proportion of damping component than the constraining layer, which need have none. We have discovered a surprising variation in damping efficiency with the relative amounts of hold-out component and damping component. In particular it may be observed that a significant improvement in damping efficiency abruptly occurs on decreasing the amount of hold-out component below some critical amount. The reason for this is not fully understood, but we believe that it is due to the hold-out component forming a semi-discontinuous phase and that the damping component forming a semi-continuous phase. In articles designed for their recoverability, a hold-out component (which may be 100% of the article) forms a strong continuous phase. If the stiffer hold-out component were the continuous phase, the material would transmit, rather than dissipate, vibrational energy. In order to ensure that the damping material forms the continuous phase, we prefer that it be present as at least 60%, especially 70% of the total weight.

The damping material preferably has less than 40%, more preferably less than 25%, especially less than 20% of inorganic fillers. Such fillers are commonly added to elastomeric materials for various reasons, particularly as extenders to reduce cost. Whilst no serious disadvantages result for most prior art uses of elastomeric articles, we have noticed that a deterioration in damping performance may be expected. Where fillers are to be used, we prefer they be of a type that does not degrade damping, for example platelet-type fillers. Also, we prefer that the material does not contain significant amount of plasticizer, and more preferably that it contains significantly no plasticizer. The effect of a plasticizer is to facilitate molecular chain motion, and thus to reduce dissipation.

Preferably the tangent delta value of a single layer damping component alone is at least 0.6, more preferably at least 1.0, most preferably at least 2.0. The tangent delta value of the combined material (damping and hold-out components) in the article again in a single layer is at least 0.5, more preferably at least 0.75, most preferably at least 1.0. In the case of a multi-layer article exhibiting constrained layer damping, the damping layer itself will preferably have a tangent delta value of at least 0.2, more preferably at least 0.75, most preferably at least 1.5.

The hold-out component will in general be only partially crystalline, and we prefer the degree of crystallinity of the two components together to be low but the precise level will depend on the materials used. The damping component will in general have zero crystallinity. The degree of crstallinity of the two components is preferably 40% or less, more preferably 30% or less.

It may be preferable to achieve a desired degree of overall crystallinity (for the purpose of recoverability) by employing a small amount of a highly crystalline hold-out, rather than a large amount of a hold-out of low crystallinity.

Examples of preferred polymeric materials suitable as a damping component include: butyl rubber, acrylic rubber, polyvinyl chloride, Viton (trade mark) and other fluorocarbon rubbers; natural rubber, nitrile rubbers, polyurethanes, Kraton (trade mark) and other styrene-butadiene copolymers, and vinyl acetate/ethylene copolymers or other such elastomers, and blends of two or more of these polymers.

The layer may be cross-linked to enhance its physical properties especially recoverability. Preferably it is cross-linked by irradiation at a dose of 2 to 40 Megarads, or is cross-linked chemically to achieve an equivalent level of cross-linking.

The dimensional-recoverability is provided for a different reason in the present invention than in the vast majority of prior art recoverable articles. In the prior art the intention is to provide an environmental seal and, in the case of simple tubular articles at least, all that is needed is enough recovery force to avoid leak paths. In some other prior art articles, pressure differences have to be resisted and mechanical strength such as strain relief across a cable joint is required. In the present invention, by contrast, damping article and substrate have to be accoustically coupled, for example by bonding, such that very high frequency vibrational energy can be transferred to the damping article. This is an onerous requirement, even where the engagement is aided by adhesive. We prefer, therefore, that the damping article exhibit a recovery force of at least 30 kPa, especially at elast 60 kPa, more especially 100 kPa.

Various additives may be added to the polymer or polymers to render them more suitable as damping materials. For example the damping material may be made fire resistant possibly by adding a flame retardant such as alumina trihydrate. Various processing aids may be added, including plasticizers. Graphite, mica or talc or other such fillers, particularly plate-like fillers, may be useful in enhancing damping.

The damping article may have any suitable shape, depending on the article to be damped. In general, it is preferred that the article be hollow at least when installed, and may comprise for example a hollow moulded part. For example, the article may be tubular, either open at each end or in the form of an end cap. If desired, the article may have a more complex shape, including bends, T-shapes and branches depending upon the structure to be damped. It is particularly preferred that the article be capable of being installed on an elongate substrate, without access to an end of the substrate. This ability is referred to in the pipeline and cable accessories art as "wrap-around". A wrap-around article is simply one that can be positioned around a substrate and secured in position. In its simplest form, such an article may comprise for example a wrap-around sleeve having the form a sheet of material whose opposing edges are provided with some means for holding them together after the sheet has been wrapped around a substrate. For example, in U.K. Pat. No. 1,155,470 a recoverable wrap-around sleeve is disclosed having upstanding ridges, known as rails, running along respective opposing longitudinal edges. These rails are held together by sliding over them a channel substantially C-shaped in cross-section.

An alternative wrap-around article comprises a tape, which may be wrapped around an elongate substrate in a helical fashion. Such a tape will in general be supplied with some means to maintain it in the wrapped configuration, for example a clamp or clip could be provided at each end to prevent the ends unwrapping. After the tape had been wrapped, and the ends secured, it would be heated to cause it to shrink into engagement with the substrate around which it had been wrapped.

The damping article may be used in conjunction with a sealing material such as an adhesive. The sealing material may be applied to the substrate, and then the damping article applied. A further possibility is to provide a sealing material as part of the damping article, for example as a coating on a surface of the article that will engage the substrate in use.

Preferably the sealing material comprises a heat-activatable adhesive, since in that case a single heating step may cause activation of the adhesive and heat-shrinkage of the damping material. Examples of heat-activatable adhesives include hot-melt adhesives such as polyamides, and two or more part curing systems. We prefer hot-melt adhesives, since the melting step is reversible allowing removal of the damping article by a simple further heating step. The presence of an adhesive does not destroy the advantages over the prior art that were described above; in the present invention the adhesive merely aids engagement that is also provided by recoverability, whereas in the prior art an adhesive that is awkward to handle had to be used since it was the sole means of application of the damping material and of achieving engagement.

It can be seen that, by means of the present invention, a substrate can be damped by the simple and quick expedient of applying a damping material by dimensional-recovery. The damping article need not be precisely constructed to correspond to the shape of the substrate since a variety of shapes can be dealt with by a single recoverable article. The damping material may be much lighter than prior articles and may be easily removed. These benefits may be achieved at least in part because the damping article includes its own delivery and installation system. A further advantage of recoverability is that a single size of recoverable article (for example tubular or wrap-around sleeved or hollow shaped part) may be suitable for recovery into engagement with a wide range of sizes of substrate.

The invention is further illustrated by the accompanying drawings, in which:

FIG. 1 shows a pipe surrounded by a single layer damping article;

FIGS. 2 and 3 show damping efficiency for various polymer blends;

FIG. 4 shows a pipe surrounded by a damping article exhibiting constrained layer damping;

FIG. 5 shows a pipe with a tape wrap of a damping material; and

FIG. 6 shows a wrap-around sleeve of a damping material.

FIG. 1 shows a pipe 1 or other structure subject to vibration, having a tubular damping article 2 heat-shrunk thereon. The invention is particularly suitable for damping structures of diameter from 1–100 cms, especially 2–20 cms diameter. In the case of pipes, the thickness of the layer of damping material is preferably from 0.3–3.0, especially 0.5–2.0 times, and more especially 0.7–1.3 times the thickness of the material of the pipe. Typically the layer will have a thickness of at least 0.2 cm, preferably at least 0.4 cms.

Two preferred damping materials may be mentioned. The first comprises an EVA copolymer (comprising a 70% vinyl acetate/30% ethylene copolymer) as a damping component and high density polyethylene (HDPE) as a hold-out component. The following blends of these two materials were tested for their suitability as damping materials. The numbers given are weight percentages.

| Example | EVA Copolymer | HDPE |
| --- | --- | --- |
| 1a | 69 | 31 |
| 1b | 75 | 25 |
| 1c | 81 | 19 |
| 1d | 87 | 13 |

Various dimensionally-expanded samples of these compositions were tested for their recovery performance. The efficiency of recovery (the dimensional change on recovery as a percentage of that required to achieve the initial undeformed dimension) for Examples 1a and 1b was 99–100%. The amount of snap-back (the loss in the expanded dimension before recovery is deliberately brought about, as a percentage of the extent of expansion) was from 11–22% for Example 1a and between 24 and 38% for example 1b. For Example 1c the efficiencies of recovery were from 96–100%, and snap-back was 46–49%. The values for Example 1d were 79–92% and 64–82% respectively. Where a high level of snap-back is expected, it can be somewhat off-set by a high degree of initial expansion. It can be seen therefore that satisfactory recoverability can be achieved with these blends.

Their ability to act as damping materials is shown in FIG. 2, which gives tangent delta values for each of the four blends as a function of temperature. A significant improvement in damping ability with decreasing HDPE hold-out can be seen. Particularly noticeable is a significant change in damping between 25 and 31% HDPE. It is believed that this is due to the formation of some sort of continuous HDPE structure within this range, which provides a low attenuation pathway for mechanical energy. The man skilled in the art will therefore be able to select an optimum balance of damping and heat-shrink properties. Such optimum balance is believed to occur at the highest level of hold-out component possible before a low-attenuation pathway for mechanical energy is formed on further increasing the level of that component (see the abrupt changes in damping performance illustrate in FIG. 2).

A second preferred damping material comprises a blend of Viton (a trade mark for a fluorocarbon rubber) as a damping component, and Kynar (a trademark for polyvinylidene fluoride) as a hold-out component. The following blends of these two materials were tested for their suitability as damping materials. Again, the numbers given are weight percentages.

| Example | Viton | Kynar |
| --- | --- | --- |
| 2a | 69 | 31 |
| 2b | 75 | 25 |
| 2c | 81 | 19 |
| 2d | 87 | 13 |

As before, various samples were tested for their recovery performance. Recovery efficiencies for Example 2a were 100%, and snap-back was 4–9%. The values for Example 2b were 99–100% and 6–13% respectively; for example 2c they were 99–100% and 15–26%; and for Example 2d they were 90–100% and 26–46%.

Such materials may be used around structures such as mines as an anechoic coating. For such uses the coating is preferably tubular rather than wrap-around. Also, for use as a mine coating or for other uses where the article will be in water, its acoustic impedance is preferably matched to that of water. Acoustic impedance may be varied by varying the modulus and/or the density of the material for example by addition of fillers.

FIG. 3 shows the damping performance of these materials as a plot of tangent delta value against temperature. As above, a significant improvement in damping ability with decreasing hold-out component (here Kynar) was observed.

The effect of cross-linking is in general greatly to improve recovery performance but somewhat to diminish damping for a given polymeric system. Example 1 relates to samples that had not been cross-linked, and Example 2 to samples that had been cross-linked before expansion. This effect was noticed more with the blends of Example 1 than those of Example 2. The blends of Example 1 were found to exhibit a greater recovery force than those of Example 2. In general a cross-linking dose of 2–40, especially 8–12 Megarads will be beneficial.

FIG. 4 shows constrained layer damping of a pipe 1. A damping article comprising a damping layer 3 and a constraining layer 4 has been recovered into engagement with the pipe. More than two layers may be provided, if desired, for example in order to provide damping in more than one temperature range or in more than one frequency range. Thus four or more layers may be provided acting as two or more constraining articles. We prefer that both layers be dimensionally-recoverable, but for some qses, a novel dimensionally-recoverable damping article may be provided that comprises a recoverable driver layer (which may also be the constraining layer) laminated to a non-recoverable damping layer. Such an article may have a hollow configuration, or be capable of being maintained in such a configuration, in which case the damping layer should be the inner layer and the driver an outer layer. Recovery of the driver layer causes the damping layer to be deformed into engagement with the substrate to be damped.

In one embodiment, the damping layer 3 comprises recoverable EVA copolymer or Viton or a blend thereof with say HDPE, and the constraining layer 4 comprises HDPE. In this case, however, the damping layer may be chosen principally for its damping performance since its recoverability is not so important due to the presence of the constraining layer 4. The properties of layer 4 as regards constraining and recovery are not in conflict, and a stiff, high modulus material may be used. For example HDPE alone, or HDPE with a suitable filler, for example 15-25% talc, or 5-15% glass or silica may be used. Increasing stiffness of the constraining layer improves damping. Some fillers can be used to enhance the modulus of the constraining layer. A recovery efficiency (as defined above) of a constrained layer damping article of about 100% can easily be achieved, and snap-back can easily be kept below 10%.

Tangent delta values of 0.05 cm thick steel plate, were compared with the values for the plate together with a single layer damping article of thickness 0.1 cm, and with the values for the plate together with a 0.05 cm damping layer plus 0.05 cm constraining layer. In spite of the same thickness of material added to the pipe the constrained layer damping was seen to be far superior.

An outer layer (which may be the constraining layer itself, or an additional layer) may be chosen for its protective function. For example it may be especially abrasion resistant, cut or tear resistant, UV resistant, or resistant to fluids such as oils or fuels.

FIG. 5 shows a damping article in the form of a tape 5 being wound around a pipe 1.

A heat-shrinkable wrap-around damping sleeve 6 is shown in FIG. 6. The sleeve has rails 7 along opposing edges that can be held together by sliding over them a channel 8. The sleeve is wrapped around a substrate to be damped, the channel installed, and recovery carried out by heating. The sleeve exhibits constrained layer damping by virtue of a damping layer 3 and a constraining layer 4.

Each of the embodiments of damping articles illustrated may be provided with an adhesive to aid tight engagement of the article with a substrate. It may be noted that pipes or other substrates of very large size may be acoustically damped with ease using the present invention. For example the tape of FIG. 5 may be used or two or more sleeves of FIG. 6 may be formed together.

We claim:

1. An article for acoustic damping of a substrate, comprising
   (i) a damping first layer comprising a material that
      (a) alone exhibits viscoelastic damping, having a tangent delta value of at least 0.2 at a temperature between −10° C. and 300° C. and at a frequency between 5 and 100,000 Hz; and
   (ii) a constraining layer that is laminated to a substantial portion of a major surface of said first layer and that comprises a material that is dimensionally-recoverable having a recovery of at least 10%; the first and second layers together having a tangent delta value of at least 0.1 at a temperature between −10° C. and 300° C. and at a frequency between 5 and 100,000 Hz; and being capable of exhibiting constrained layer damping when installed on the substrate.

2. An article according to claim 1 in wrap-around sleeve form.

3. An article according to claim 1, in the form of a hollow moulded part.

4. An article according to claim 1, in which the constraining layer comprises a thermoplastic polymeric material.

5. An article according to claim 1 in tape form.

6. A article according to claim 1 in sheet form.

7. A multi-layer damping device comprising at least two articles acoustically coupled together, each of said articles comprising:
   (i) a damping first layer comprising a material that
      (a) alone exhibits viscoelastic damping, having a tangent delta value of at least 0.2 at a temperature between −10° C. and 300° C. and at a frequency between 5 and 100,000 Hz; and
   (ii) a constraining layer that is laminated to a substantial portion of a major surface of said first layer and that comprises a material that is dimensionally-recoverable having a recovery of at least 10%; the first and second layers together having a tangent delta value of at least 0.1 at a temperature between −10° C. and 300° C. and at a frequency between 5 and 100,000 Hz; and being capable of exhibiting constrained layer damping when installed on the substrate.

8. A method of providing acoustic dampling of a substrate comprising the steps of:
   (i) positioning an article adjacent a surface of the substrate subject to acoustic vibration, said article comprising a layer of a material that
      (a) is heat-shrinkable, having a recovery of at least 10%; and
      (b) exhibits viscoelastic damping, having a tangent delta value greater than 0.5 at a temperature between −10° C. and 300° C., and at a frequency between 5 and 100,000 Hz; and
   (ii) heating said article to cause the article to shrink to achieve acoustic coupling with said surface.

9. A method according to claim 8 in which the step of positioning the article comprises wrapping the article around the surface, and securing the article in a wrapped around configuration.

10. A method of providing acoustic damping of a substrate comprising the steps of:
    (i) positioning an article adjacent a surface of the substrate subject to acoustic vibration, said article comprising a layer of a material that
       (a) is heat-shrinkable having a recovery of at least 10%;
       (b) exhibits viscoelastic damping, having a tangent delta value greater than 0.5 at a temperature between −10° C. and 300° C., and at a frequency between 5 and 100,000 Hz; and
       (c) comprises a blend of
          (I) an elastomeric material capable of exhibiting visco-elastic damping; and
          (II) a hold-out component that is polymeric and at least partially crystalline and being capable of holding the material in a stretch condition; wherein the material is present in an amount of at least 60% of a total weight of the material; and
    (ii) heating said article to cause the article to shrink to achieve acoustic coupling with said surface.

11. A method according to claim 10 in which the step of positioning the article comprises wrapping the article around the surface, and securing the article in a wrapped around configuration.

* * * * *